May 30, 1933.   H. L. GILLESPIE   1,911,997
DEVICE FOR DETERMINING THE ANGLE OF A DRILLED WELL HOLE
Filed June 1, 1931   3 Sheets-Sheet 1
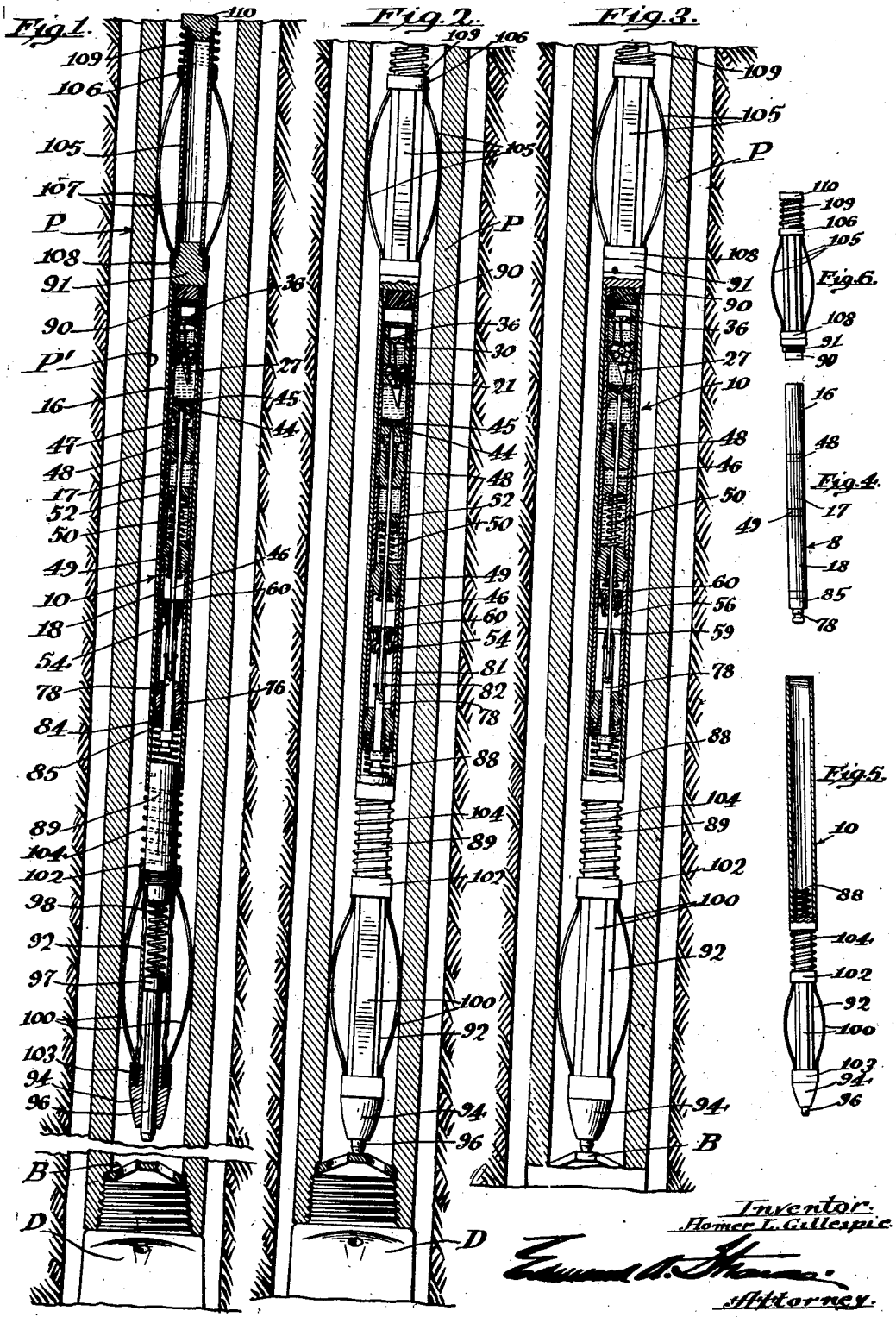
Inventor:
Homer L. Gillespie
Attorney

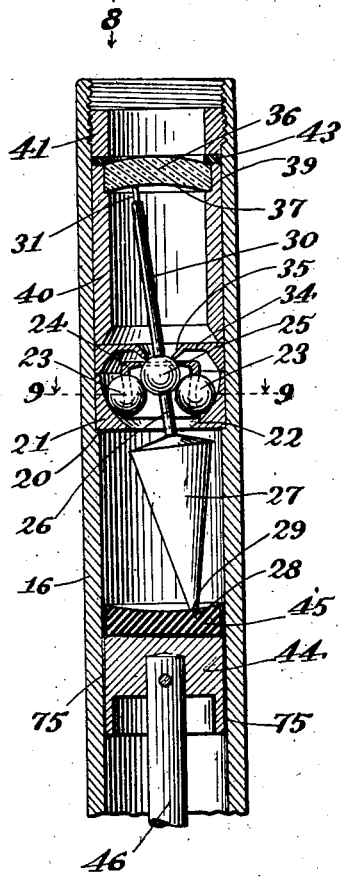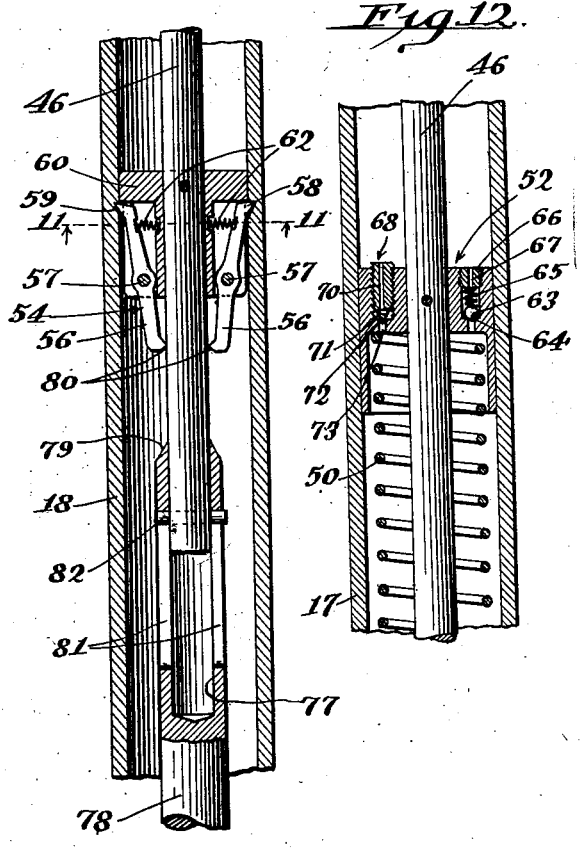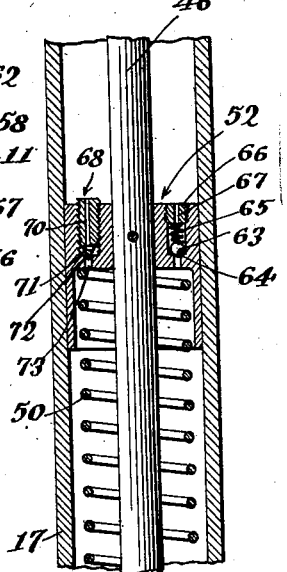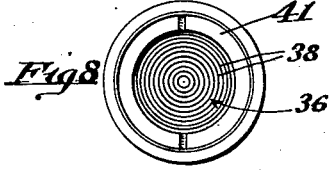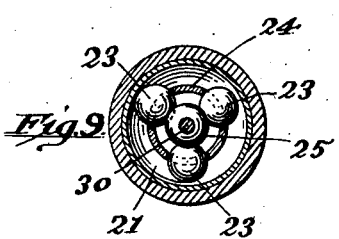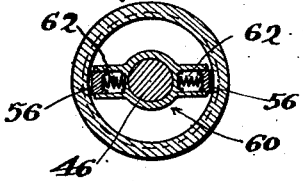

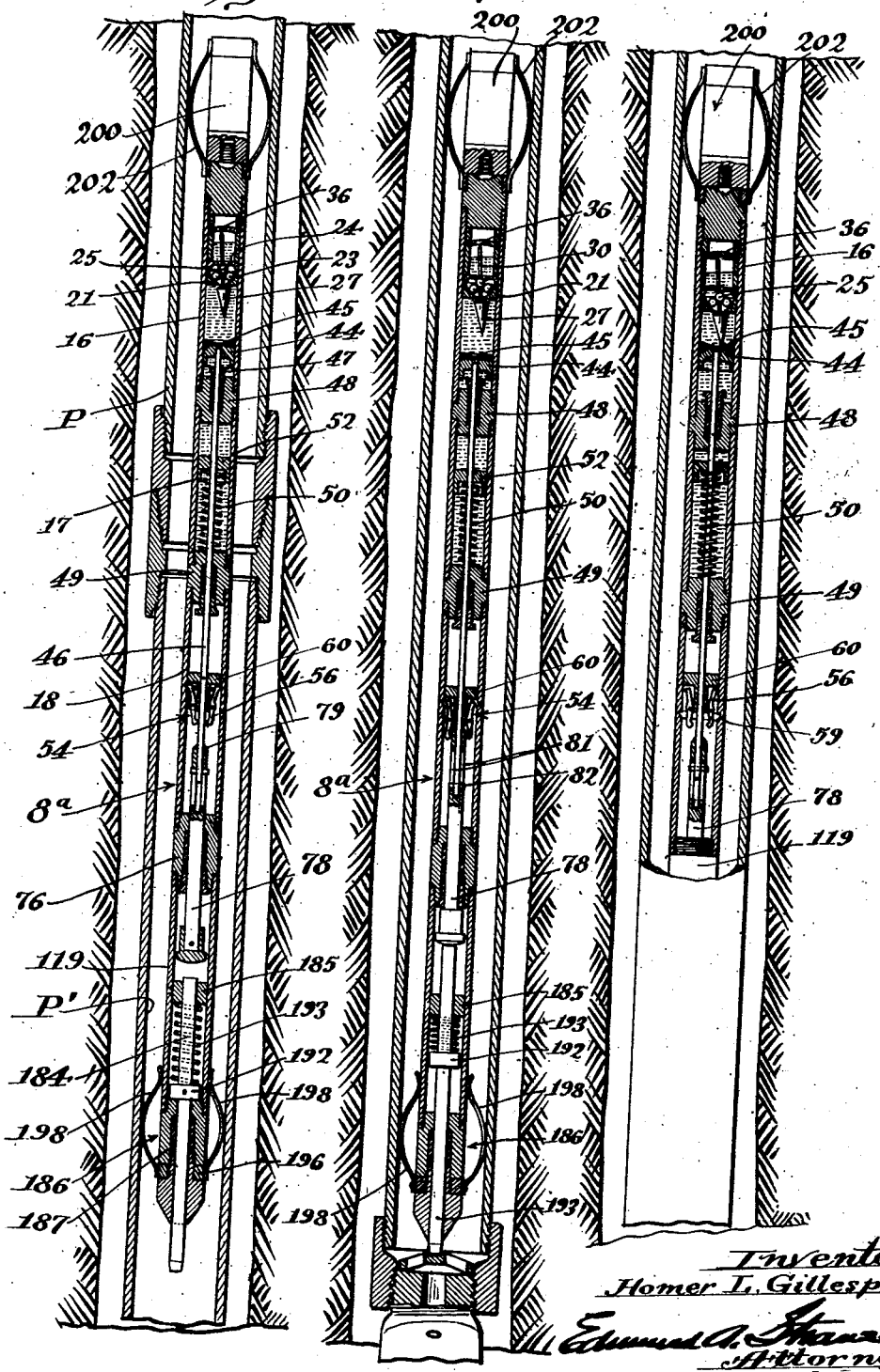

Patented May 30, 1933

1,911,997

UNITED STATES PATENT OFFICE

HOMER L. GILLESPIE, OF LONG BEACH, CALIFORNIA, ASSIGNOR OF ONE-HALF TO EDWARD M. FRID, ONE-FOURTH TO ALEXANDER T. COOPER, AND ONE-FOURTH TO LAWRENCE F. VALENTINE, ALL OF LONG BEACH, CALIFORNIA

DEVICE FOR DETERMINING THE ANGLE OF A DRILLED WELL HOLE

Application filed June 1, 1931. Serial No. 541,257.

This invention relates to an instrument for determining the inclination or deviation from the vertical of well holes.

In drilling wells with the usual rotary tools, it is seldom possible to maintain a perfectly straight or perpendicular hole, especially when the bit on the lower end of the drill pipe encounters a fault in the formation. Although the deviation from the vertical may be very slight, (after the bit encounters such a fault) it increases as the hole is drilled to greater depth. In some instances, the deviation from the perpendicular becomes so pronounced that the well casing cannot be landed after drilling of the hole.

Several forms of apparatus have been heretofore employed to determine inclination. The most commonly known among them is the so-called acid bottle by which the inclination is determined by acid therein etching a line on the inner surface of the bottle. However, it is not possible to obtain a direct reading with the acid bottle, due to the meniscus varying with different strengths of acids, hence calculated corrections must be made before an accurate indication of the inclination can be determined. In order to make the above calculation, it is necessary to take the acid bottle to a laboratory equipped for such purposes, which in turn results in loss of time in drilling operations.

The broad object of the present invention is to provide a device in which a universally mounted weight and pointer, together with releasable engaging means associated therewith, are employed to determine the inclination of a well hole.

A further object is to provide a device of the character stated including a cylindrical casing provided with a plurality of centering springs adjacent each end thereof adapted to engage the bore of a rotary drill pipe, and pass therethrough by gravity, the indicator means being actuated when said casing reaches the bottom of the pipe.

A still further object is to provide an instrument for determining inclination, arranged in such a manner that a direct reading may be obtained without the necessity of a mathematical calculation.

Other objects and advantages will be apparent from the following description, reference being had to the accompanying drawings, in which—

Fig. 1 is a section taken through an inclined well hole, drill pipe, and the indicating device as it appears when passing downwardly therethrough.

Fig. 2 is a view similar to Fig. 1 showing the position assumed by the indicating mechanism of the device immediately after it has reached the bottom of the drill pipe.

Fig. 3 is a view analogous to Figs. 1 and 2 showing the mechanism of the device when in set or indicating position.

Fig. 4 is a side elevation of the indicator registering member removed from the casing.

Fig. 5 is a side elevation of the protector casing, shock absorber, and lower centering spring members.

Fig. 6 is a side elevation of the upper centering spring members.

Fig. 7 is a section taken through the upper portion of the registering member of the device showing in detail the mounting of the indicating mechanism in set or locked position.

Fig. 8 is a top plan view of Fig. 7 as indicated by arrow 8 of Fig. 7.

Fig. 9 is a section taken on line 9—9 of Fig. 7.

Fig. 10 is a detail section taken through the latch release members and associated parts.

Fig. 11 is a section taken on line 11—11 of Fig. 10 in the direction indicated by the arrows.

Fig. 12 is a detail section taken through the valves for controlling the movement of the indicator retaining means.

Fig. 13 is a section taken through an inclined well hole, drill pipe, and a modified form of the indicating device as it appears when passing downwardly therethrough.

Fig. 14 is a view similar to Fig. 13 showing the position assumed by the indicating mechanism of the device immediately after it has reached the bottom of the drill pipe.

Fig. 15 is a view analogous to Figs. 13 and 14 showing the mechanism of the device when in set or indicating position.

Referring more specifically to the drawings, 8 generally designates the registering member of the device which, in the preferred embodiment of the invention, is removably mounted in the casing 10. The registering member is made up of a plurality of tubular sections 16, 17, and 18 for the purpose of assembling the indicating mechanism hereinafter described.

Mounted in section 16, and engaging a shoulder 20 is a bearing member 21 having a concave face 22 upon which rest a plurality of steel balls 23 held in spaced relation by a ring or retainer 24, the balls 23 being in turn engaged by a single ball 25.

Secured to the ball 25, and projecting downwardly therefrom through an opening formed in the bearing 21 is a rod 26 to which is rigidly connected a weight 27, preferably of conical shape, similar to that of a plumb bob terminating in a needle point 28. Projecting upwardly from the ball 25 is an arm 30 terminating in a pointer 31, it being noted that the rod and arm are on a common axis intersecting the center of ball 25.

The concave surface 22 of the bearing 21 is formed on a radius described from the center of ball 25, and the assembly of said balls is held in engagement with the bearing 21 by an annulus 34 having a downwardly turned flange 35 engaging the ball 25 as shown in Fig. 4.

Disposed above the assembly of balls is an element 36 formed of transparent material, preferably glass, and formed on the inner concave face 37 of said member is a plurality of concentric circles 38 (see Fig. 5) which serve as a scale in connection with the pointer 31 to determine inclination.

Element 36 rests on a seat 39 formed in a spacer 40, which in turn engages the annulus 34, the element, annulus, and bearing being held in place by a ring 41 screw threaded into the upper end of the casing and engaging a gasket 43.

From the foregoing, it will be seen that the arm and weight 27 are mounted for universal tilting movement, in other words, the arm 30 will remain in a vertical position regardless of the angular relation assumed thereto by the axis of the casing.

Slidably mounted in section 16 of the casing below the weight 27 is a head 44 having a recess formed therein in which is mounted a pad 45 of resilient material, preferably rubber. The pad has a concave face formed on a radius described by the end of the weight, and serves to engage and retain the arm in the position it may assume in relation to the axis of the casing.

The head is secured to a connecting rod 46 extending downwardly therefrom through packing compressed by a gland 47 in a coupling 48 connecting casing sections 16 and 17, and through packing carried by a similar coupling 49 into casing section 18.

Encircling the rod is an expansion coil spring 50, the opposite ends of which engage the coupling 49, and a collar 52 secured to said rod. This spring serves to bring the head 44 into engagement with the weight upon release of a latch device, generally designated at 54.

Referring to Fig. 10, the latch device consists of a pair of pawls or the like 56 pivotally mounted on pins 57 carried by a member 60 secured to the rod 46, the pawls having tongues 58 which engage a groove 59 formed in the wall of section 18 of the casing, and are urged into engagement therewith by expansion coil springs 62.

Mounted in an opening formed in the collar 52 is a ball check valve 63 normally held in engagement with a seat 64 by a spring 65, which in turn is compressed by a plug 66 having an opening 67 therein. A needle valve 68 is threaded into an opening formed in the collar, and has ports 70 and 71 formed therein, and a tapered point 72 adapted to register with a port 73 formed in the collar.

Valve 68 serves to retard upward movement of the head (on release of the latches) in order that the arm 30 may come to rest before it is engaged by said head, while the check valve opens on downward movement to permit a quick return or setting of the pawls.

The section 17 of the casing is filled with oil to check movement of the collar through the ports of valve 68, while section 16 is partially filled with oil to steady or prevent undue tilting of the arm and weight.

A plurality of channels 75 are formed in the side face of the head to permit free movement of it.

Slidably mounted in an opening formed in a member 76 connected to casing section 18 is a push pin 78. The push pin has a bore 77 formed therein into which the rod 46 extends, and a beveled upper end face 79 adapted to engage the ends 80 of the pawls. Carried by the rod and extending into slots 81 formed in the push pin is a cross pin 82 which serves to form a connection between said push pin and rod during setting of the pawls.

The push pin also extends through a packing gland 84 and an opening in a cap 85 connected to the lower end of member 76.

The registering member 8 above described is mounted in the casing 10 with the cap engaging an expansion coil spring 88, the lower end of which rests on a stem 89 secured to or formed integral with the casing.

The upper end of section 16 of member 8 is engaged by a cushion 90 carried by a head 91 screw threaded into the upper end of the casing, the spring 88 being slightly under compression when the parts above described are assembled as shown in Fig. 1.

Screw threadedly connected to the lower end of the stem is a sleeve 92 to which is connected a guide member 94 having an opening therein in which is slidably mounted a plunger 96.

The plunger is provided with a head 97 engaged by a compression coil spring 98 disposed in the sleeve and engaging the lower end of the stem, the spring serving as a shock absorber when the instrument reaches the bottom of the drill pipe and contacts with a bridge plate —B— as shown in Fig. 2.

The upper end of bow springs 100 (preferably four in number) are secured to a follower 102 slidably mounted on the stem, while their lower ends are connected to a collar 103 engaging a shoulder formed on the guide member 94.

The bow springs serve to center the instrument in the drill pipe designated at —P—, and are urged into engagement with the bore —P'— of said pipe by an expansion coil spring 104 encircling the stem with its upper and lower ends engaging the end face of casing 10 and the upper end of the follower, respectively.

It will be noted that, although the tension in the bow springs would tend to center the instrument as above referred to, the expansion spring serves to expand them equally into engagement with the bore —P'—, thus insuring positive centering of it.

Screw threadedly connected to or formed integral with the head 91 is a stem 105 upon which is slidably mounted a follower 106 connected to the upper ends of bow springs 107, the lower ends of which are secured to a collar 108 engaging a shoulder formed on the head.

The bow springs 107 are urged into engagement with the bore of the drill pipe, in a like manner to the springs 100, by an expansion coil spring 109 encircling the stem and engaging the follower and shoulder formed on a plug 110 screw threaded into the upper end of said stem.

In operation, the device is adapted to be inserted into the drill pipe with the head out of engagement with the weight, and the pawls in locked position as shown in Fig. 1. The device then passes downwardly through the drill pipe by gravity until the end of the plunger engages the upper face of a bridge plate —B— resting on the pin of the drill bit —D—.

The casing 10 then remains stationary, and the registering member 8 continues to move downwardly therein (compressing the spring 88) until the pawls are released from the grooves by engagement of the tapered end 79 of the push pin with the ends 80 of said pawls through contact of the push pin with the face of the stem.

The head 44 together with the rod and latch pawls then move upwardly in unison through expansion of coil spring 50 until the pad 45 engages the bottom face 29 of the weight as shown in Fig. 3. The weight, arm and pointer are then held rigid with the head, due to the needle point 28 penetrating the pad 45, and the ball 25 engaging the flange 35 of the annulus 34. It being noted that, due to retarding movement of the head through action of the regulating valve 68, the weight and pointer will have come to rest in a perpendicular position before engagement with said head as above described.

The drill pipe is then pulled from the hole, the indicating device removed from the last stand of said pipe, and the registering member removed from the casing as shown in Fig. 4. The inclination of the hole may then be determined by observing the position of the pointer 31 in relation to any one of the circles 38 on the element 36.

After having determined the inclination of the well hole as above described, the registering member is adapted to be reset for another test. This is accomplished by engaging the end of the push pin (with a suitable tool, not shown) and pulling it outwardly until the pawls again engage groove 59 in section 18.

Referring to Figs. 13, 14 and 15, the registering member designated at 8ª is of exactly the same construction as that previously described, except that it is not mounted in the protector casing 10. In this construction, a plunger 184 is slidably mounted in an opening formed in a guide plate 185 disposed in a casing 119 secured to the member 76, and extends through packing 187 mounted in a member 186 secured to said casing.

Encircling the plunger and disposed between the plate 185 and a stop collar 192 secured to said plunger is an expansion coil spring 193 which serves to urge the plunger outwardly.

Secured to a collar 196 carried by the member 186 is a plurality of bow springs 198, and removably connected to section 16 is a member 200 which carries a plurality of bow springs 202, which coact with springs 198 to center the casing in the drill pipe.

In the operation of the above described construction, the plunger first engages the bridge plate, the pawls are then released during continued downward movement of the registering member 8ª due to contact of the plunger with the push pin as shown in Fig. 14. The head then moves upwardly through expansion of spring 50 until the pad 45 engages the weight as shown in Fig. 15.

The construction shown in Figs. 1 to 3, although more expensive to produce, is preferred to that shown in Figs. 13 to 15 inasmuch as the registering member is protected against damage through contact with the tool joints or any other obstruction, as it passes downwardly through the drill pipe.

I claim:

1. An instrument for determining inclination of a drilled well hole comprising a casing adapted to be passed through the rotary drill pipe within the hole by gravity, a weighted indicating pointer mounted in said casing for universal tilting movement, a transparent element having a scale formed thereon mounted in said casing above said pointer, a locking head slidably mounted in said casing below said pointer, latch means for holding said head out of engagement with said weighted indicating pointer, means normally urging said locking head into engagement with said weighted indicating pointer, and means for releasing said latch means to permit the locking head to move into engagement with the weighted indicating pointer to hold the same against movement, said releasing means operable through contact with a bridge plate engaging the pin of the drill pipe bit.

2. An instrument for determining inclination of a drilled well hole comprising a casing adapted to be inserted into and pass through a drill pipe within the hole, a weighted member mounted in said casing, an arm having an indicating pointer carried by said weighted member, a transparent element having a scale formed thereon mounted in said casing above said arm and pointer, a locking head slidably mounted in said casing, latch means for normally holding said head out of engagement with said weighted member, means normally urging said locking head into engagement with said weighted member, and means for releasing said latch means, to permit said locking head to be moved into engagement with said weighted member to hold the pointer in a stationary position, said latch releasing means operable through contact with a bridge plate positioned at the lower end of the drill pipe.

3. An instrument for determining inclination comprising a casing, a ball bearing mounted in said casing, a weighted indicating pointer mounted in said bearing for universal movement, a transparent scale element mounted in said casing above said indicating pointer, a head slidably mounted in said casing for locking said pointer in its indicating position, latch means for normally holding said head out of engagement with said weighted member during the lowering of the instrument into the well, means normally urging said head into engagement with said weighted member, and means for releasing said latch means to permit the head to engage the pointer, whereby said head will be moved into engagement with said weighted member to lock the same against movement.

4. An instrument for determining inclination comprising a casing, a transparent scale element mounted in the upper end of said casing, a tiltably mounted indicator disposed below said transparent scale element, a head slidably mounted in said casing, a pair of members interposed in said casing forming a liquid compartment below said head, a connecting rod secured to said head and extending downwardly therefrom through said members, a collar rigidly secured to said rod, an expansion spring disposed in the compartment formed in said casing and normally urging said collar upwardly, latches carried by said rod normally holding said head out of engagement with said indicator, means carried by said rod for releasing said latches, and a valve mounted in said collar adapted to retard upward movement of said collar and head by restricting the passage of liquid contained in the compartment of the casing upon a release of said latches, whereby said indicator may come to rest before said head is moved into engagement therewith.

5. An instrument for determining inclination comprising a casing, a transparent scale element mounted in the upper end of said casing, an indicator tiltably mounted for universal movement disposed below said transparent scale element, a locking head slidably mounted in said casing, a pair of members interposed in the casing below said head forming a compartment therein, a rod secured to said head and extending downwardly therefrom through said members, a collar having a liquid port rigidly secured to said rod, an expansion spring disposed in the compartment formed in said casing and normally urging said collar upwardly, latches carried by said rod normally holding said head out of engagement with the indicator, a guide member secured to the lower end of said casing, a push pin mounted in said guide member, slidably engaging said rod and adapted to release said latch means, and a needle valve mounted in said collar, said needle valve controlling the port in said collar and being adapted to retard upward movement of said collar and head by restricting the passage of liquid contained in the compartment through the valve controlled port formed in said collar upon release of said latch means, whereby said indicator may come to rest before said head is moved into engagement therewith.

6. An instrument for determining inclination comprising a casing provided with a latch groove, a weighted indicating member universally mounted in said casing, a transparent element mounted in said casing above said member, a locking head slidably mounted in said casing, a pair of members interposed in the casing below said head forming a liquid compartment therein, a rod secured to said head and extending downwardly therefrom through said members, a collar secured to said rod, an expansion spring disposed in the compartment formed in said casing and urging said collar upwardly, a pair of latch pawls pivotally mounted on said rod, springs urging the upper ends of said pawls into engagement with the latch groove formed in the wall of said casing, and a push pin having a tapered upper end slidably engaging said rod to release said latch pawls from said groove, whereby said head will be moved into engagement with said weight by action of said expansion spring upon release of said pawls.

7. In an instrument for determining the inclination of a drilled well hole, a casing adapted to be inserted into the drill pipe within the hole and pass therethrough by gravity, a plurality of bow springs carried by said casing adjacent its lower end, a sleeve connected to the lower ends of said bow springs, a follower connected to the upper ends of said bow springs, a spring under compression engaging the follower adapted to urge said bow springs into engagement with the bore of the drill pipe, a spring supporting member detachably connected to the upper end of said casing, a plurality of bow springs carried by said spring supporting member, and a coiled spring under compression engaging the bow springs to urge the bow springs into engagement with the bore of the drill pipe, whereby said casing will be accurately centered therein.

8. In an instrument for determining inclination, a bearing having a concave face, a plurality of balls held in spaced relation engaging the face of said bearing, a center ball engaging said plurality of balls, an arm having a pointer on its upper end secured to said center ball, a weight rigidly connected to said center ball, a transparent scale element having a concave face described by the end of said arm mounted in said casing, a head having a concave face disposed below said weight, latch means for normally holding said head out of engagement with said weight, means for releasing said latch means, and means operable upon release of said latch means to move said head into engagement with said weight, whereby said arm and pointer will be held against movement.

9. An apparatus for determining the inclination or deviation from the vertical of drilled well holes comprising an elongated casing adapted to be inserted into a drill pipe within the hole and pass therethrough by gravity, a transparent scale element having a concave inner face mounted in the upper end of said casing, a bearing member having a concave face mounted in said casing below said scale element, a plurality of balls engaging said bearing member, means for holding said balls in spaced relation, a center ball engaging said plurality of balls, an annulus mounted on said bearing and having a downwardly turned flange disposed above the center ball, an arm projecting upwardly from said center ball and terminating in an indicating pointer, a weight secured to and depending from said center ball, a head having a concave face slidably mounted in said casing below said weight, the concave face of said scale element, bearing and head each being formed on radii described from the center of said single ball, a rod secured to said head and extending downwardly therefrom, latch means carried by said rod for holding said head out of engagement with said weight, a coil spring encircling said rod and normally urging said head upwardly, and a push pin slidably engaging said rod arranged to release said latch means.

10. An apparatus for determining inclination of a well hole comprising in combination a casing, a stem secured to the lower end of said casing, a sleeve connected to said stem, a guide member connected to said sleeve, a plunger slidably mounted in said sleeve, a shock absorbing spring disposed between said plunger and stem, a head removably secured to the upper end of said casing, a registering member comprising a tubular section slidably mounted in said casing, a spring disposed in said casing between said registering member and stem, a transparent scale element mounted in the upper end of the tubular section, a weighted indicating pointer mounted for universal tilting movement below said scale element, a locking head slidably mounted in said tubular section below said indicating pointer, a spring normally urging said locking head into engagement with said pointer, a rod secured to said locking head, latches carried by said stem and normally holding said locking head out of engagement with said pointer against the action of said spring, and a push pin slidably engaging said rod and arranged to release said latches through contact with said stem on downward movement of the registering member within the casing after it has come to rest.

In testimony whereof I affix my signature.

HOMER L. GILLESPIE.